(12) United States Patent
Degraaf et al.

(10) Patent No.: US 7,395,236 B2
(45) Date of Patent: Jul. 1, 2008

(54) RISK MANAGEMENT SYSTEM AND METHOD PROVIDING RULE-BASED EVOLUTION OF A PORTFOLIO OF INSTRUMENTS

(75) Inventors: Jim Degraaf, Toronto (CA); Ben De Prisco, Woodbridge (CA); Antonin Dolezal, Toronto (CA)

(73) Assignee: Algorithmics Software LLC, Wilmington, DE (US)

( * ) Notice: Subject to any disclaimer, the term of this patent is extended or adjusted under 35 U.S.C. 154(b) by 631 days.

(21) Appl. No.: 10/828,269

(22) Filed: Apr. 21, 2004

(65) Prior Publication Data

US 2004/0205018 A1    Oct. 14, 2004

Related U.S. Application Data

(63) Continuation of application No. 09/324,920, filed on Jun. 3, 1999, now abandoned.

(51) Int. Cl.
*G06Q 40/00* (2006.01)
(52) U.S. Cl. .......................... 705/36 R; 705/35; 705/37
(58) Field of Classification Search ................... 705/36, 705/36 R
See application file for complete search history.

(56) References Cited

U.S. PATENT DOCUMENTS

| | | | |
|---|---|---|---|
| 4,346,442 A | 8/1982 | Musmanno |
| 4,642,768 A | 2/1987 | Roberts |
| 4,674,044 A | 6/1987 | Kalmus et al. |
| 4,694,397 A | 9/1987 | Grant et al. |
| 4,744,026 A | 5/1988 | Vanderbei |
| 4,744,027 A | 5/1988 | Bayer et al. |
| 4,744,028 A | 5/1988 | Karmarkar |
| 4,752,877 A | 6/1988 | Roberts et al. |
| 4,797,839 A | 1/1989 | Powell |
| 4,953,085 A | 8/1990 | Atkins |
| 5,101,353 A | 3/1992 | Lupien et al. |

(Continued)

FOREIGN PATENT DOCUMENTS

EP    0401203 A2    12/1990

(Continued)

OTHER PUBLICATIONS http://web.archive.org/web/19980422134537/http://algorithmics.com/.*

(Continued)

*Primary Examiner*—Kambiz Abdi
*Assistant Examiner*—Shahid R Merchant
(74) *Attorney, Agent, or Firm*—Bereskin & Parr

(57) ABSTRACT

A risk management system and method provides for the establishment of dynamic portfolios, whose evolution over time is defined by one or more rules. Each dynamic portfolio can have instruments added and removed over time in accordance with Trade Managers as a result of evaluation of the user-defined rules which can be dependent upon various attributes, including time, portfolio contents, risk factor values, risk values and other information. Such dynamic portfolios can be used to analyze risk associated with settlement, liquidity and/or collateral management issues, to name a few. Also, a user can define multiple candidate trading strategies, each implemented in one or more Trade Managers, and the user can then analyze the effectiveness of the candidate strategies, before adopting one.

27 Claims, 4 Drawing Sheets

U.S. PATENT DOCUMENTS

| | | | |
|---|---|---|---|
| 5,148,365 | A | 9/1992 | Dembo |
| 5,729,700 | A * | 3/1998 | Melnikoff ................ 705/36 R |
| 5,761,442 | A | 6/1998 | Barr et al. |
| 5,799,287 | A | 8/1998 | Dembo |
| 5,806,049 | A | 9/1998 | Petruzzi |
| 5,819,237 | A | 10/1998 | Garman |
| 5,884,287 | A | 3/1999 | Edesess |
| 6,021,397 | A | 2/2000 | Jones et al. |
| 6,122,623 | A | 9/2000 | Garman |
| 6,188,992 | B1 * | 2/2001 | French ................... 705/36 R |
| 6,249,769 | B1 * | 6/2001 | Ruffin et al. ................... 705/7 |
| 6,400,173 | B1 | 6/2002 | Shimizu et al. |
| 6,519,728 | B2 | 2/2003 | Tsujii et al. |
| 2002/0171449 | A1 | 11/2002 | Shimizu et al. |
| 2002/0194564 | A1 | 12/2002 | Tsujii et al. |
| 2003/0006795 | A1 | 1/2003 | Asayama et al. |
| 2003/0032263 | A1 | 2/2003 | Nagao et al. |

FOREIGN PATENT DOCUMENTS

| | | |
|---|---|---|
| EP | 0573991 A1 | 12/1993 |
| EP | 0686926 A2 | 12/1995 |
| JP | 3077163 | 4/1991 |
| JP | 3103966 | 4/1991 |
| JP | 3189862 | 8/1991 |
| WO | WO 92/15064 | 9/1992 |
| WO | WO 92/15953 | 9/1992 |
| WO | WO 97/22075 | 6/1997 |
| WO | WO 98/54666 | 12/1998 |

OTHER PUBLICATIONS

Karen Spinner (Apr. 1998). Hedging credit, market risk. Wall Street & Technology: Product Digest,23-25. Retrieved Nov. 27, 2007, from ABI/INFORM Global database. (Document ID: 26672989).*

Salman Azbar, "Data Compression Techniques For Stock Market Prediction", IEEE, 1994, pp. 72, 74, 76, 78, 80, 82.

"Hedging Tools For Investment Professionals", Wall Street Computer Review, Mar. 1989, 3 pages of text and p. 42.

Algo 99, Dynamic Simulation Presentation, Ben De Prisco, Jun. 3, 1999, San Francisco, CA, 53 pages.

Risk Watch User's Guide, Version 3.0, Jul. 1997, 290 pages.

Recent Press Releases—For immediate release. Date: Oct. 30, 1998.

Introducing RiskWatch 3.1. Date: Oct. 30, 1998.

What's New in RiskWatch Version 3.1.2? Date: Mar. 8, 1999.

* cited by examiner

RISK MANAGEMENT SYSTEM AND METHOD PROVIDING RULE-BASED EVOLUTION OF A PORTFOLIO OF INSTRUMENTS

This application is a continuation application of pending U.S. patent application Ser. No. 09/324,920, filed on Jun. 3, 1999, the contents of which are hereby incorporated by reference.

FIELD OF THE INVENTION

The present invention relates to a risk management system and method. More specifically, the present invention relates to a risk management system and method which provides for the analysis of risk of a portfolio of instruments wherein the portfolio evolves over time.

BACKGROUND OF THE INVENTION

Risk Management systems are known and are commonly employed by financial institutions, natural resource-based corporations, trading organizations, government regulators or other users to make informed decisions to assess and/or manage the risk associated with the operations of the user. Such systems are well known to be computer implemented and executed by a processor.

One popular example of a known risk management system is the RiskWatch V3.1.2 system, sold by the assignee of the present invention. This system is very flexible and allows users to employ models of the instruments in the user's portfolio, which models are evaluated at appropriate time intervals, in view of a set of possible scenarios. Each scenario comprises a vector of values for risk factors employed in the models, at each time interval, and each scenario has associated with it a probability of the scenario occurring. The resulting risk values of the instruments, when the models are evaluated under each scenario at each time interval of interest, are then used to produce one or more risk metrics which are examined to assess the risk to the user of holding the portfolio of instruments under the evaluated scenarios. The instruments which can be modeled and assessed by the system are not particularly limited. The system merely requires that an adequate model can be defined for the instrument. Instruments can include, without limitation, various financial instruments such as equities, options, derivatives, etc. and can also include non-financial instruments such as reservoir capacities, insurance products, etc.

Known risk management systems do however suffer from some problems. One of the more common problems is that portfolios being evaluated by prior art risk systems are generally modeled as static objects and yet portfolios change, or evolve, with time. For example, a bond in a financial portfolio can have one or more coupons which produce income at a specified time and thus the bond instrument evolves over time to become a bond instrument and a cash amount. As another example, a portfolio under consideration can include one or more options (for financial instruments, foreign exchange, commodities, etc.) that will be executed when "in the money" to buy or sell the underlying commodity, thus changing the portfolio composition. In either of these cases, and in many others, the portfolio being analyzed by the risk system changes, perhaps significantly, as time passes.

To date, the risk management systems and methods of which the present inventors are aware have not dealt well with the issue of portfolio evolution. Commonly, such systems have at best permitted the user to define a limited evolution strategy, for example specifying that the cash from a bond coupon will be re-invested into a pre-selected instrument, such as a money market account paying interest at the prevailing overnight interest rate, and have analyzed the risk under that assumption. In these systems, portfolio evolution is dealt with on a predefined, fixed, basis and, for example, the cash received from the bond's coupon discussed above will always be modeled as having been invested in the money market account (or whatever other instrument has been predefined by the user) even under scenarios wherein this will provide a poor investment return.

In the real world, which the risk system is attempting to simulate, a user would re-invest this cash into an appropriate instrument, in accordance with market conditions at the relevant time. Under some market conditions, the cash could be invested in a 90 day US T-bill and in other conditions could be invested in the money market account, a bond, etc.

In another example, a user can have a portfolio of short term bonds with mixed maturities which he wishes to perform various risk analyses on. Over some period of time of interest, such as a three to five year period, a significant portion of the bonds in the portfolio can mature. Prior art risk systems did not provide mechanisms whereby the maturity amounts of the bonds could be reinvested into instruments which were appropriate at the date of their maturing. Instead, the users of such prior art systems were forced to pre-define the re-investment instrument in a fixed manner, selecting a similar bond for example, even though under some particular scenarios under consideration this would represent a poor investment that the user would not actually make. Thus, prior art risk management systems are less accurate and less realistic at assessing risk of an evolving portfolio than is desired.

Further, a user of a risk management system can have developed one or more potential trading strategies to evolve their portfolios appropriately under a variety of market conditions, such as strategies which specify which types of instruments to divest from and which types of instruments to invest in under various possible future scenarios. Prior art risk management systems do not allow such a user to evaluate how well these potentially competing strategies perform or their effect on the amount of risk resulting for the associated portfolios.

It is therefore desired to have a risk management system and method which permits a user to employ dynamic trading strategies using rules which effectively define how a portfolio of instruments will evolve over time and to permit the user to assess the performance of competing sets of trading strategies.

SUMMARY OF THE INVENTION

It is an object of the present invention to provide a novel risk management system and method which obviates or mitigates at least one disadvantage of the prior art systems. Like the prior art, systems, computer implemented methods and computer readable mediums are designed to be executed by a processor in a well known manner.

According to a first aspect of the present invention, there is provided a method of determining the risk associated with a portfolio of instruments for a set of scenarios of risk factors over a time period of interest, the composition of which portfolio can evolve over time to include different instruments and positions of instruments, comprising the steps of:

(i) defining at least one trading strategy for said portfolio, each said strategy including at least one rule, least one tracked instrument, at least one tracked attribute applied to said rule, at least one target goal, at least one trading instrument and at least one funding instrument;

(ii) for each time of interest for each scenario in said set of scenarios, evaluating said at least one rule in each said at least one trading strategy, in view of said at least one tracked attribute, in turn to determine if a test condition defined by said rule has been met;

(iii) when said test condition is met, changing the composition of said portfolio for subsequent consideration by simulating the execution of appropriate trades of said at least one trading instrument to achieve said at least one target goal and employing said changed; and (iv) producing a risk metric for said portfolio, encompassing said changed composition.

According to another aspect of the present invention, there is provided a dynamic portfolio of instruments for use with a risk system, the composition of said portfolio being changeable with time, the portfolio comprising:

a holdings structure indicating instruments and their quantity in the portfolio; and a strategy structure indicating at least one trade manager, each said trade manager including a rule defining a condition which can be evaluated in view of at least one attribute and each said trade manager altering the quantity of at least one said instrument in said portfolio to achieve a target attribute for said portfolio when evaluation of said rule results in said condition being met.

According to yet another aspect of the present invention, there is provided a risk management system operable on a set of instruments and a set of scenarios, each scenario including risk factor values and a scenario probability, said system comprising:

at least one risk engine operable to determine a risk value for each instrument in said set of instruments, said risk value determined by evaluating, in view of said risk factors in said scenario, a model stored for said instrument;

a database to store each said determined risk value;

at least one dynamic portfolio including at least one trade manager, each trade manager including a rule corresponding to one of said at least one user-defined trading strategies and said trade manager evaluating said rule in view of at least one attribute relating to said portfolio and said scenarios and altering the composition of said portfolio in accordance with said at least one trading strategy when the conditions of said rule are met; and an aggregating engine to retrieve said determined risk values and said scenario probabilities for said portfolio to produce a risk metric corresponding to the compositions of said portfolio.

The present invention provides a risk management system and method for the establishment of dynamic portfolios, whose evolution over time is defined by one or more rules. Each dynamic portfolio can have the quantities of the instruments in the portfolio increased or decreased, including the total removal of instruments from the portfolio and/or the addition of new instruments to the portfolio, thus changing the composition of the portfolio. Trading strategies are defined by a user to define how the dynamic portfolio should evolve and one or more Trade Managers implement these strategies. Each Trade manager evaluates one or more user-defined rules which can be dependent upon various attributes, including time, portfolio contents, risk factor values, risk values or other information and changes the contents of the portfolio in accordance with the trading scenario. Such dynamic portfolios can be used to analyze risk associated with settlement, liquidity and/or collateral management issues, to name a few. Also, a user can define multiple candidate trading strategies, each implemented in one or more Trade Managers, and the user can then analyze the effectiveness of the candidate strategies, before adopting one.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
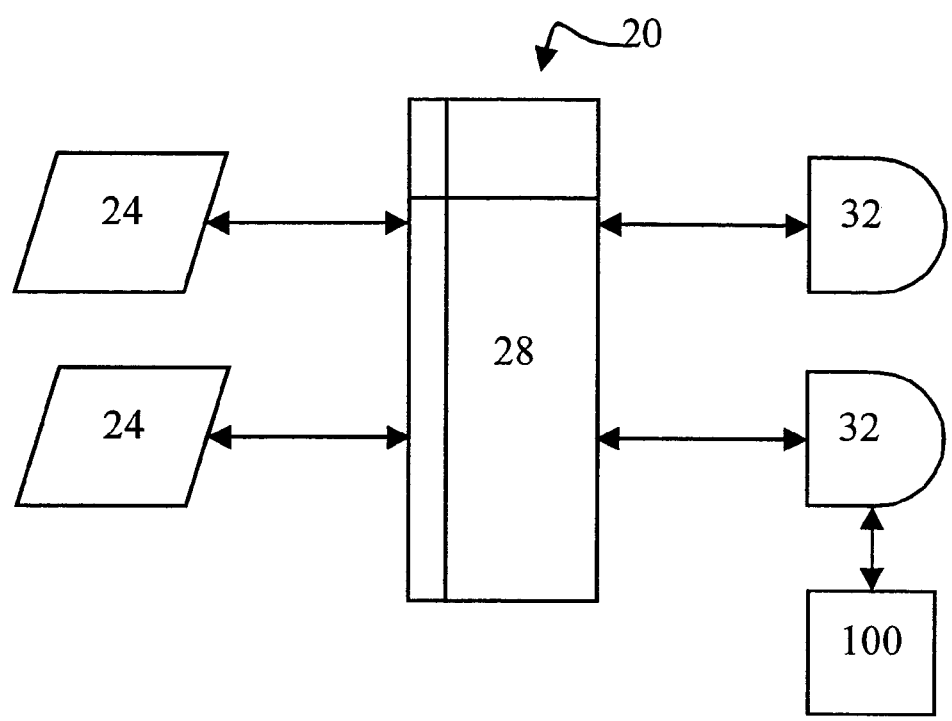
FIG. 1 shows a risk management system in accordance with an embodiment of the present invention, including a dynamic portfolio.

In co-pending U.S. patent application filed Jun. 2, 1999, accorded Ser. No. 09/323,680 and assigned to the assignee of the present invention, a novel risk management system is disclosed and the contents of this reference are incorporated herein by reference. As shown in FIG. 1, this novel risk management system 20 can include one or more risk engines 24 which operate on models of instruments employing risk factors and the values of these risk factors are defined in scenarios that are stored in a database 28. Risk engines 24 evaluate the models with the corresponding sets of risk factor values of a scenario to determine risk values for the scenario which are also stored in database 28. System 20 further includes one or more aggregation engines 32 which operate to retrieve determined risk values from database 28 to determine appropriate risk metrics for a portfolio of the instruments stored in database 28.

As described in detail in the above-mentioned co-pending United States patent application, database 28 stores determined risk values at the leaf level, i.e.—for each individual instrument or for pre-selected groups of instruments, as well as storing other information of interest, such as risk factor values, derived risk metrics, determined credit exposures, etc. This allows aggregation engines 32 to examine a variety of portfolios of instruments, without necessarily requiring the re-calculation of risk values for each instrument in the portfolio under consideration. Portfolios of instruments can be pre-defined and stored in database 28, or elsewhere, for use by aggregation engine 32 or can be created on an ad-hoc basis by a user. This allows a user to examine the effect that different portfolio make ups can have on various risk metrics for the portfolios or to determine the marginal risk associated with a proposed transaction or to analyze risk at various levels of an enterprise without requiring recalculation of risk values for instruments in the portfolios.

Figure 2:
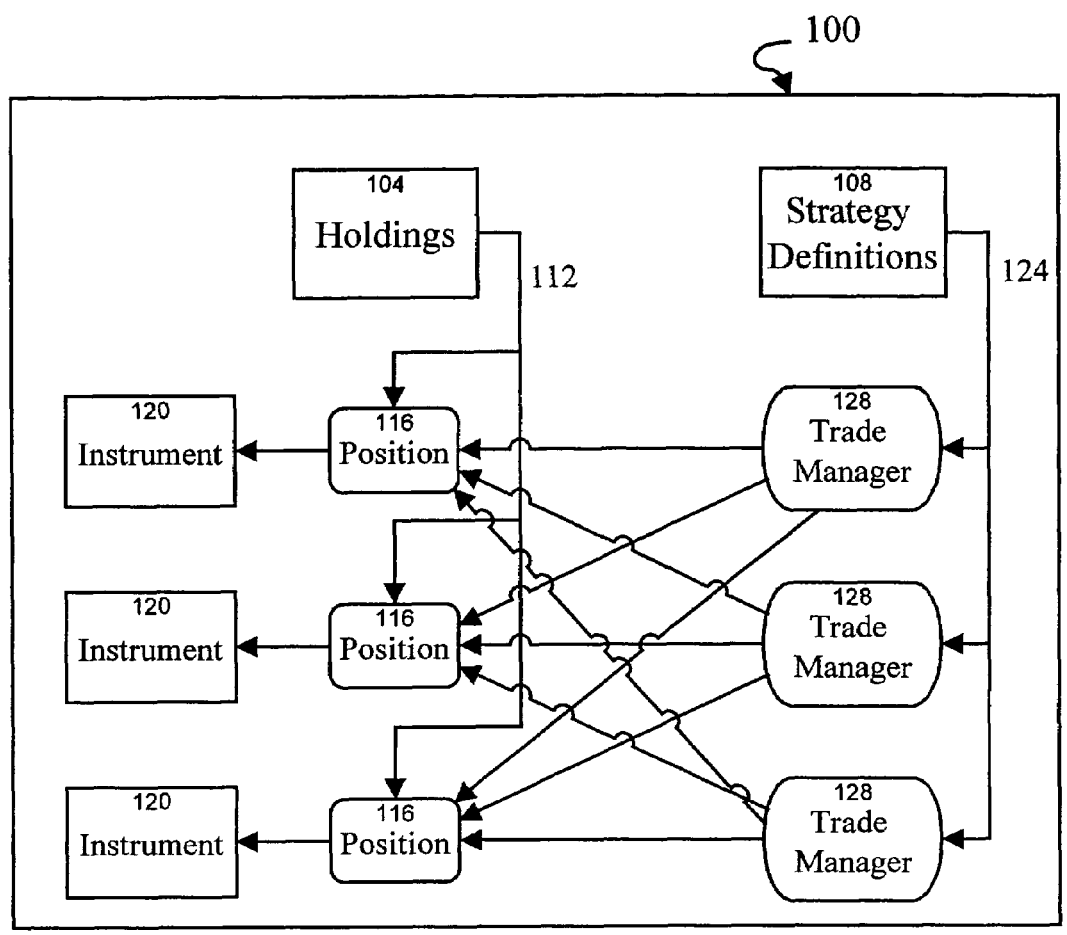
FIG. 2 shows the dynamic portfolio of FIG. 1 in more detail.

In an embodiment of the present invention, system 20 further includes one or more dynamic portfolios 100 which interface with aggregation engines 32 and FIG. 2 shows a dynamic portfolio 100 in more detail. A dynamic portfolio 100 is one whose evolution with time is defined by one or more rules. As shown, dynamic portfolio 100 includes a Holdings structure 104 and a Strategy Definitions structure 108. Holdings structure 104 defines all of the instruments which are held in the dynamic portfolio and the position (i.e.—how many short or long, or a flat position) held in those instruments in the portfolio. Holdings structure 104 includes a pointer 112 to each position 116 of a respective instrument 120 (or pre-defined group of instruments) in dynamic portfolio 100 and positions 116 can change, according to specified rules, under specific scenarios.

Strategy Definitions structure 108 includes a pointer 124 to each Trade Manager 128 in dynamic portfolio 100, wherein a Trade Manager 128 is created and maintained for each trading strategy implemented by dynamic portfolio 100. Each Trade Manager 128 has one or more rules, or conditions, defined for it and which it examines and operates on to initiate trades to increase or decrease positions 116 of instruments within dynamic portfolio 100. For example, a Trade Manager 128 can be defined with a rule that indicates that when a bond coupon matures, the resulting cash is to be invested in either money market account or 90 day U.S. Treasury bills (T-bills), depending upon which instrument has a higher yield at the appropriate time, under the scenario that the dynamic portfolio 100 is being considered at. Dynamic portfolio 100 can include multiple Trade Mangers 128, as desired, to implement multiple trading strategies. For example, a second Trade Manager 128 can be defined, in addition to the above-mentioned Trade Manager 128 which tracks and operates on bond coupons, wherein the second Trade Manager 128 tracks the delta (volatility) of equity option instruments in dynamic portfolio 100 and initiates trades to purchase the underlying equities as hedges, to reduce the delta for this portion of dynamic portfolio 100 to a pre-selected level.

Figure 3:
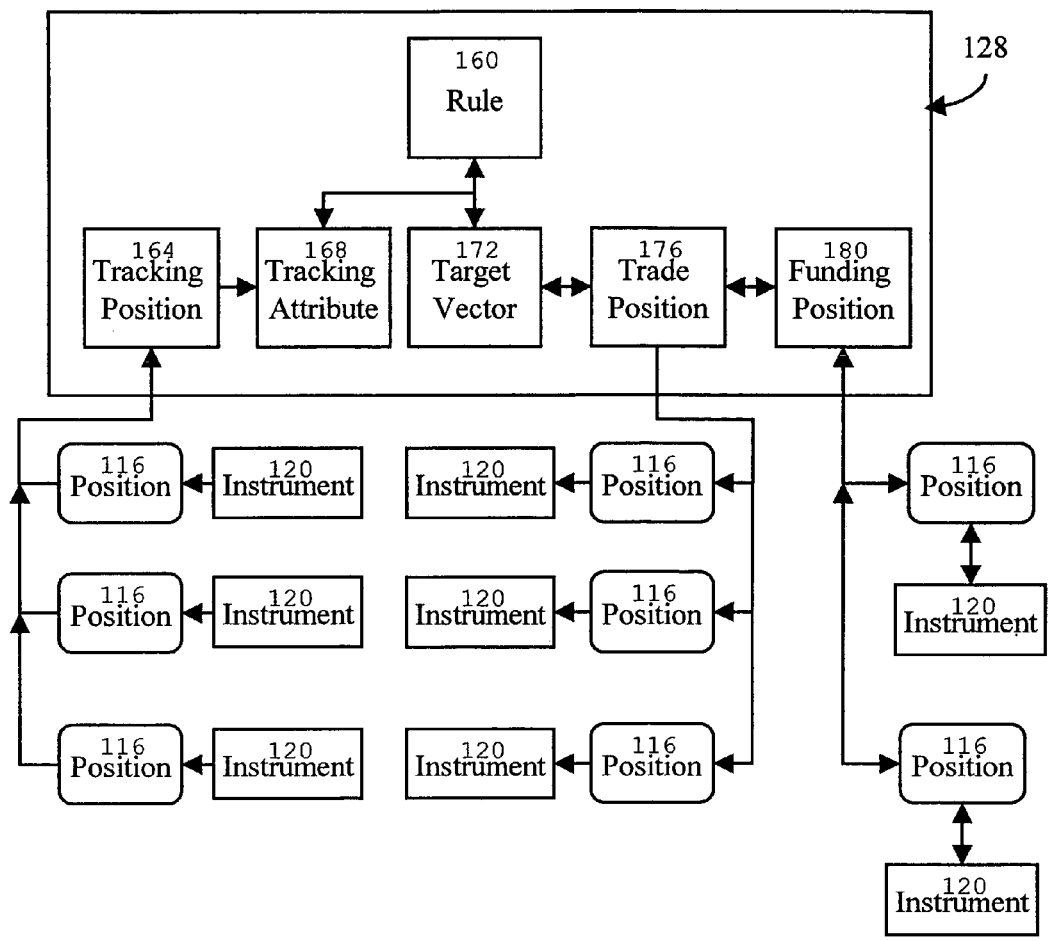
FIG. 3 shows a Trade Manager of the dynamic portfolio of FIG. 2.

FIG. 3 shows a Trade manager 128 in more detail. As shown, each Trade Manager 128 includes a Rule structure 160, a Tracked Position list 164, a Tracking Attribute list 168, a Target Vector 172, a Trade Position list 176 and a Funding Position list 180, each of which is described in further detail below.

As mentioned above, each Trade Manager 128 allows a user of risk system 20 to define one or more rule-based trading strategies by which a portfolio will be evolved over time. Rule structure 160 holds the rule, or rules, for a particular strategy. In a present embodiment of the invention, these rules are defined in a grammar and/or scripting language, although any other suitable method of defining such rules can be employed as desired. When evaluated in a scenario, each rule accepts one or more input attributes, which can be risk factors defined for the scenario, risk values derived under the present scenario or other information available under the scenario, such as the make-up or contents of the portfolio or foreign exchange rates, etc.

An English language example of a rule could be, "If the delta of the options for NASDAQ-listed equities in the portfolio exceeds 0.5, then purchase corresponding underlying equities until the total delta for the equities and the options does not exceed 0.5", although the rule would be written in an appropriate form for consideration by Trade Manager 128.

Tracking Position list 164 indicates the instruments and/or positions which are tracked by the Trade Manager 128 when evaluating a rule or rules in Rule structure 160. In the example of the Trade Manager for controlling the delta of the options for NASDAQ-listed equities options discussed above, Tracking Position list 164 will indicate each option and its position in dynamic portfolio 100 and each equity that is added to the portfolio to alter the delta of the combined holdings in equities and options.

Tracking Attribute list 168 indicates the particular quantity or quantities which are tracked by Trade Manager 128 and which should therefore be determined or otherwise be available to Trade Manager 128. In particular, these can be risk factors which are defined for the particular scenario under consideration, instruments and/or positions or any other underlying information for the scenario under consideration. In the example of the Trade Manager 128 for the delta of the options and their underlying NASDAQ-listed equities, discussed above, Tracking Attribute list 168 indicates the delta of those options and equities which must be calculated by Trade Manager 128 or which can be a defined risk factor in a scenario under consideration.

Target Vector 172 indicates the result, or results, which are desired from trades implemented by Trade Manager 128 for each entry in the Tracking Attribute list 168. For example, Target Vector 172 can indicate that a delta of 0.5 or less is desired for combined holdings of options and equities listed in Tracking Position list 164.

Trade Position list 176 indicates the instruments and their positions which can be traded in dynamic portfolio 100 to achieve the desired targets defined in Target Vector 172 and the number of trade positions entered in Trade Position list 176 is equivalent to the number of tracking attributes listed in Tracking Attribute list 168. In the NASDAQ-listed options and equities example, Trade Position list 176 will list the equities corresponding to each call or put option in the Tracking Position list 164 that are to be purchased or sold to achieve the desired delta for the holdings.

Finally, Funding Position list 180 lists the instruments and positions which can be traded to fund trade strategies implemented by Trade Manager 128. For example, the Funding Position list 180 can list very liquid instruments, such as cash in a money market account, or short term T-bills, etc. which can be sold or purchased to fund trades initiated by Trade Manager 128. In the above-mentioned example of the options and NASDAQ-listed equities, appropriate amounts of the instruments in Funding position list 180 will be traded to fund the purchase or sale (as appropriate) of the required underlying equities to achieve the desired delta for the holdings.

As will be apparent to those of skill in the art, the positions in dynamic portfolio 100 are updated accordingly after the purchase and sale trades initiated by Trade Manager 128 are performed, including the purchase or sale of any instruments on Funding Position list 180. As will also be apparent to those of skill in the art, Tracking Position list 164, Trade Position list 176 and Funding Position list 180 can each refer to some or all of the same instruments and positions. For example, an instrument included in Tracking Position 164 to determine an attribute for a rule in Rule structure 160 can also be included in Trade Position list 176 so that it can be sold, or additional amounts purchased, as appropriate.

In a present embodiment of the invention, a rule or rules defined in Rule structure 160 can be of any one of five types of rules that embody a condition, namely: a band rule; a barrier rule; a comparison rule; a functional rule; and a composite rule. Where a rule is of a type that embodies a condition, each rule or set of rules returns a "TRUE" value when the condition of interest is present in the portfolio under the present scenario and time and a "FALSE" value at all other times. Where a Trade Manager 128 has rules of a type that embody a condition, a Trade Manager 128 only initiates trades when its rule, or rules, are TRUE.

A band rule defines a trigger band for an appropriate attribute and tests that the current value of that attribute is within the trigger band or without (as selected by the user when defining the rule). This type of rule can be used to test for an attribute's value moving outside of, or into, a specified range. A barrier rule defines a trigger level which the attribute either should not be above or should not be below (as selected by the user when defining the rule). A comparison rule defines a comparison between values, such as risk factors or derived values, and is TRUE when the value of a first user selected attribute exceeds the value of the other user selected attribute. A functional rule allows a user to define a script or function which is evaluated to determine if the rule is TRUE. Functional rules allow rules to be based upon a variety of attributes, both those derived by the function and those operated on by the function. Finally, a composite rule allows a user to define a composite rule employing the above-mentioned other types of rules which are combined with boolean operators such as AND, OR, NOT and XOR (Exclusive OR).

In the present invention, values used for trigger levels, trigger band points, target values in Target Vector 172, etc. can be absolute (e.g. −0.5) or relative (e.g. −5% of the total value of the portfolio), as desired. This allows, for example, an index tracking target to be defined for a dynamic portfolio, such as a dynamic portfolio of bonds that can be created to track, within a specified range, the "duration" of the Morgan Stanley Bond Index.

The present invention also provides filters for use with rules and such filters can allow dynamic, or otherwise sophisticated, rules to be created. For example, a filter can be applied to the Tracking list in a Trade Manager to remove from consideration, when evaluating the rule, any instrument which comprises less than one percent of the total value of the portfolio.

Multiple strategy dynamic portfolios can be implemented with single rule or multiple rule Trade Managers 128, or both. Specifically, if two or more rules can share a single solution, they can be defined in a single Trade Manager 128 which will simultaneously evaluate the rules and implement trades to achieve the desired results specified in the Target Vector 172. For example, Rule structure 160 and Target Vector 172 can define that: (i) a delta for certain holdings in the portfolio not exceed a specified amount; and (ii) that cash on hand should not exceed a certain percentage of the total value of the portfolio. Clearly, one or more solutions exist which would meet both of these requirements.

In contrast, in circumstances wherein meeting the requirements of one rule can impact the success of meeting the requirements of a second rule, each rule is employed with a separate, prioritized, Trade Manager 128. For example, a first rule can require that foreign content of a portfolio not exceed twenty percent of the total present value of the portfolio to meet regulatory requirements. A second rule can require that the delta of combined holdings of options and their underlying foreign instruments not exceed a specified amount. It is clear that these two rules can be in conflict, for example if the first rule would result in the sale of some of the underlying equities to reduce foreign content while the second rule would result in the purchase of additional (possibly foreign content) underlying equities to reduce the delta of the holdings.

To prevent such conflict of rules from occurring, Trade Managers 128 also have a priority assigned to them wherein Trade Managers 128 with higher assigned priority numbers are processed before Trade Managers 128 with lower assigned priority numbers. In the above-mentioned example, the Trade Manager 128 with the foreign content rule can have a priority of two assigned to it, as the regulatory requirement must be met, and the Trade Manager 128 with the delta level rule can have a priority of one assigned to it. In this example, the priority one Trade Manager 128 is first executed, buying additional foreign content equities if required. Next, the priority two Trade Manager 128 is executed, divesting the portfolio of foreign content, even including equities just purchased by the priority one Trade Manager 128, until the regulator-imposed foreign content requirement is met. In fact, in a present embodiment of the invention the execution of all Trade Managers 128, even those with multiple rules, is prioritized. As will be apparent to those of skill in the art, the combination of multiple rule Trade Managers and prioritized evaluation of Trade Managers 128 allows sophisticated trading strategies to be defined and implemented by a user.

Figure 4:
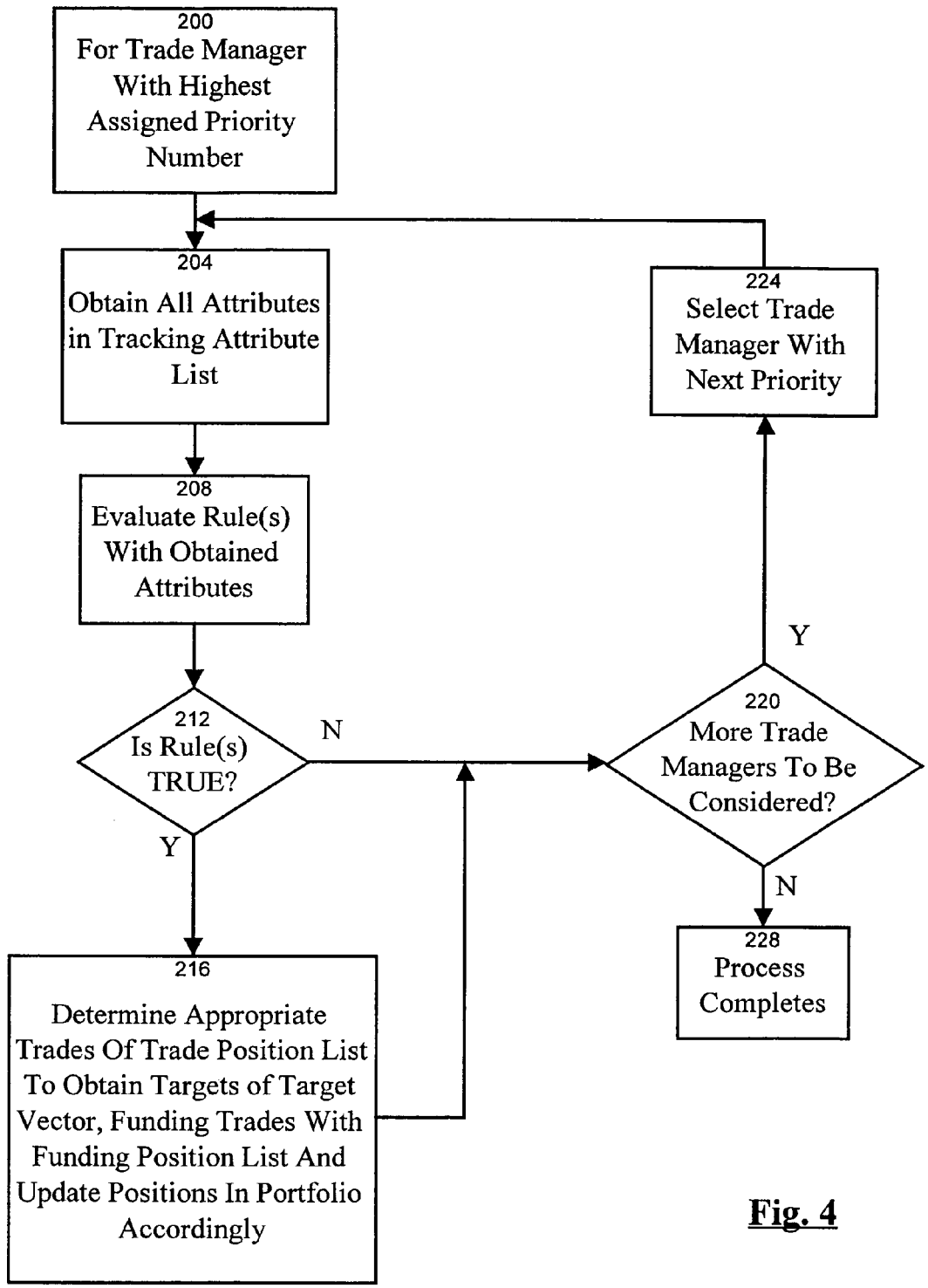
FIG. 4 shows a flowchart of the process of evaluating and updating a dynamic portfolio.

FIG. 4 shows a flowchart of the process of evaluating a dynamic portfolio 100. The process commences at step 200 wherein the Trade Manager 128 with the highest assigned priority number in dynamic portfolio 100 is selected for processing. At step 204, all of the attributes in Tracking Attribute list 168 of the Trade Manager are retrieved. As mentioned above, in system 20, database 28 stores risk factor values for each scenario at each time of interest and stores determined leaf level risk values (or aggregated value totals for pre-selected groups of instruments) for all instruments of interest. Instruments of interest include both those in any portfolio and those which can be included in a portfolio due to the operation of dynamic portfolios and those which the administrator or other manager of database 28 believes might be of interest to users.

Thus, at step 204, the selected Trade Manager 128 queries aggregation engine 32 to retrieve the required attribute values from database 28 or to determine derived values by invoking a risk engine 24, as needed. At step 208 the rule, or rules in the case of a multiple rule Trade Manager, in Rule structure 160 is evaluated with the attribute values. At step 212, a determination is made as to whether the rule, or rules that embody a condition in Rule structure 160 is TRUE. If the rule or rules are TRUE, step 216 is performed, wherein the Trade Manager 128 updates the positions in the dynamic portfolio 100, to simulate appropriate trades, of those instruments indicated by the Trade Position list 176, to obtain the targets indicated by Target Vector 172, while updating the positions of the appropriate instruments indicated by Funding Position list 180, as required.

Once the processing of step 216 is complete, or if the rule or rules, evaluated at step 212 are not TRUE, the process proceeds to step 220 wherein a determination is made as to whether any Trade Managers remain to be considered for dynamic portfolio 100. If one or more Trade Managers do remain to be considered, the next lower, priority Trade Manager is selected at step 224 and the process of steps 204 through 220 is repeated. If no Trade Managers remain to be considered at step 220, then at step 228 the process completes. The process of FIG. 4 is repeated for each dynamic portfolio 100 under consideration by system 20.

In many circumstances, the instruments on Trade Position list 176 or Tracking Position list 164 may not exist while dynamic portfolio 100 is being processed. For example, dynamic portfolio 100 can be processed for a five year period of interest, i.e.—the user wishes to assess risk or evaluate the effectiveness of a trading strategy for each month over a five year term. In such a case, one or more instruments, such as a three month equities option, may need to be available for Tracking Position list 164 or Trade Position list 176 for relevant time periods several years out from the present. As these instruments will not exist in the present, they must be simulated for inclusion in these lists. Accordingly, generic models of such instruments are provided to system 20, and usually stored in database 28, and are evaluated in view of risk factor values and other relevant information as needed for each scenario and time of interest to simulate the needed instruments. In operation, dynamic portfolio 100 will merely request the needed information from an aggregation engine 32 which, if the information is not available in database 28, will invoke a risk engine 24 to process the appropriate model to obtain the needed simulated information. This simulated information can also be stored in database 28, once it is calculated, and passed to aggregation engine 32 and dynamic portfolio 100 as needed.

Once the process of FIG. 4 is complete, an aggregation engine 32 can determine the desired risk metrics for dynamic portfolio 100, by itself or in combination with other portfolios and/or dynamic portfolios, in view of its updated positions. Again, should risk values for one or more instruments, needed to produce the desire risk metrics, be missing from database 28, a risk engine 24 can be invoked by aggregation engine 32 to determine the missing value or values, which can then be stored in database 28 for future use. Provided that models for these instruments are available, and that all necessary risk factors for those models are defined within the available scenarios, this invocation of risk engine 24 will generally be transparent to the user.

As will be apparent to those of skill in the art, since the aggregation engine 32 which produces the desired risk metrics for a dynamic portfolio 100 accomplishes this in most circumstances by merely retrieving previously calculated risk values from database 28, the evaluation of a dynamic portfolio 100 can be accomplished relatively easily, without requiring excessive computational resources. Thus, many dynamic portfolios 100 can be evaluated in a relative short period of time. Further, as multiple aggregation engines 32 can be present in system 20, dynamic portfolios 100 can be evaluated in parallel, if desired.

It is contemplated that a user can define a portfolio comprising one or more dynamic portfolios, as sub-portfolios, or that an entire portfolio can comprise a dynamic portfolio. This flexibility allows a user to model a portfolio in a manner which more accurately reflects the evolution of the portfolio over time. It is however, further contemplated that users can examine the effects of different trading strategies on their portfolios. Specifically, a user can define two or more dynamic portfolios, each dynamic portfolio having the same initial composition of instruments and positions, but having a different trading strategy or trading strategies defined for it. The user can then evaluate suitable risk metrics from each dynamic portfolio to assess the performance of each trading strategy or set of trading strategies. Depending upon the results of this evaluation, the trading strategy that best suits the needs of the user can be selected by the user for use in future trading operations.

One of the factors which can influence the way in which a portfolio evolves with time, and the risk associated with the portfolio, is the liquidity of underlying instruments. For example, the longer time period required to sell a position in an instrument or to hedge a position in an instrument, the greater the risk. Conventionally, prior art risk management systems have dealt with liquidity issues by making a broad assumption, such as assuming that a position in an instrument can be sold within a selected number of days, for example many regulatory regimes require an assumed ten day period in which to divest a position, or that hedging the instrument will require a specified number of days to accomplish. Such assumptions are generally poor ones as they ignore changes in market conditions, which can be the most significant factor affecting the liquidity of many instruments. Further, such assumptions are generally the same for all instruments in a portfolio, even when such an assumption is wildly pessimistic (for example, for a highly liquid foreign exchange position) or wildly optimistic (for example, for a position in a little traded corporate bond that may take weeks or more to sell). It will be apparent that prior art risk management systems have not represented liquidity issues in an effective manner.

In contrast, in the present invention the Trade Position lists 176 of appropriate Trading Managers 128 can include limitations, to obtain a more accurate model of liquidity-related risks, by limiting the amount of an instrument which can be sold or purchased at any one time. These limitations can be absolute, i.e.—permitting no more than 100 units to be bought or sold in the time period of interest, or can be relative, i.e.—permitting no more than 10% of total trading volume in that instrument to be bought or sold in the time period of interest. Further, a dynamic portfolio can be defined with a trading strategy having two rules and when a first of these rules is TRUE, requires the instrument to be sold and when the second of these rules is TRUE, requires the purchase of a hedge against the instrument. The rules can track appropriate attributes, such as market volatility, total trading volumes, etc. to determine when it is more appropriate to sell or hedge the instrument. These rules can be combined with the above-mentioned limitations (i.e.—can sell no more than 10% of total trading volume in the instrument each day or a hedge can only be purchased on any day for a percentage of the position held, that percentage depending upon the amount of change in the instrument's value on the preceding day, etc).

Thus, liquidity considerations can be more accurately modeled with system 20 and, as a portfolio is processed, the liquidity-related delays in executing trades (i.e.—cash flows, instrument purchases and sales, etc.) which can be time and scenario dependent, are fully incorporated into the risk metrics produced.

Another use of the present invention is for the management of collateral risk. Specifically, in many circumstances a borrowing entity will provide appropriate amounts of collateral to a lending organization to offset the lender's risk of lending funds to the borrower. In the past, many lending organizations did not recognize or consider the actual risk associated with the delivery of such collateral. Specifically, it was often assumed that collateral would be delivered simultaneously with an increase in risk. In fact, often a change in risk associated with such a loan would not be recognized for some period of time, such as a day or more, while the new level of risk was being determined. Then, once a margin or collateral call was made by the lending organization, the borrowing entity often had three or more additional days to deliver the collateral. If the required collateral was not delivered on time, typically negotiations and/or discussions would occur between the lender and the borrower which often added several more days before a resolution occurred. Of course, the risk associated with recovering the loaned funds from the collateral can increase significantly with such an increase in time.

In the present invention, such collateral risk can be included in a risk assessment. Specifically, one or more positions 116 referred to by Funding Position 180 can be defined such that they are only available N periods of time (usually days) after it is desired to sell them. For example, in a margin call example, N can be set at four days for such collateral positions and thus risk metrics determined with such positions will more accurately reflect the actual risk to the lender. In one embodiment of the present invention, one or more Trade Managers 128 can include multiple "Cash on Hand" positions that can be time-shifted as appropriate. For example, a margin call at time period T=0 to sell collateral instruments will result in a credit of funds into the Cash on Hand position at time period T=4 (assuming T is expressed in days and assuming a four day collateral delivery period). When risk metrics are assessed for time period T=4, the total available Cash on Hand position will include the sum of any remaining previously available cash and the cash from the sale of the collateral. Thus, risk metrics determined for time periods T=1, T=2 and T=3 will clearly reflect the fact that the funds from the margin call collateral at T=0 are not yet available.

In fact, by creating one or more Trading Managers 128 where N differs, a user can assess the effects of additional delay (allowing for contact and negotiations with the borrower, for example) on the risk to the lender under different market conditions. Thus a lender can recognize that, for the same ultimate level of risk, under some market conditions N can be a large number (e.g.—ten days), so that the lender can negotiate to resolve an issue with a borrower for some period of time, and that under other market conditions N might be a small number (e.g.—three days) so that the lender effectively has no time to negotiate and must take immediate steps to realize on the collateral.

Further, the above-mentioned liquidity-related risks can be incorporated in an analysis of collateral management risks by appropriately modeling the liquidity in the instruments in the dynamic portfolios. This can be a important advantage of the present invention, as margin calls or the like often occur when a significant movement has occurred in the price of an instrument and such significant movements can reduce the liquidity of the instrument, thus exacerbating the risk of realizing on the collateral at a given price.

The present invention allows a user to accurately determine risk metrics of interest for a portfolio which evolves over time. The user can define rules which are used to implement various trading strategies by which a portfolio can change with time and in response to risk factors or other attributes. A user can also define and test a variety of potential trading strategies to determine their performance and suitability for use. Appropriate trading strategies can be employed to model settlement risk, liquidity risk and collateral management risk.

The above-described embodiments of the invention are intended to be examples of the present invention and alterations and modifications may be effected thereto, by those of skill in the art, without departing from the scope of the invention which is defined solely by the claims appended hereto.

We claim:

1. A computer-implemented method of determining the risk associated with a user's portfolio by simulating changes to the composition of a simulated dynamic portfolio under a plurality of possible future scenarios at a plurality of future time steps, each of the possible future scenarios having associated therewith a probability of the scenario occurring, said method comprising the steps of
(a) generating a simulated dynamic portfolio, said simulated dynamic portfolio comprising a plurality of simulated instruments and having an initial composition that corresponds to the composition of the user's portfolio;
(b) defining at least one rule for a trading strategy in at least one trade manager for use in a simulation in which changes to the composition of said simulated dynamic portfolio are to be simulated, wherein said defining step is performed prior to executing said simulation, and wherein said at least one rule is dependent on at least one tracking attribute, on at least one tracking position, and on at least one trade position;
(c) selecting one of said plurality of possible future scenarios under which said simulation is to be performed;
(d) executing a simulation under the possible future scenario selected in step (c) at said plurality of future time steps, wherein the current time step is initially the first time step of said plurality of future time steps, wherein the composition of the simulated dynamic portfolio at the first time step is set to the initial composition of the simulated dynamic portfolio as generated at step (a), and wherein the following substeps are performed:
  i. valuing said simulated dynamic portfolio at the current time step of said plurality of future time steps, wherein said valuing step comprises retrieving at least one risk value for each of one or more subsets of said simulated instruments in said simulated dynamic portfolio from a database, wherein said database comprises a plurality of values for risk factors associated with said selected possible future scenario and said current time step, wherein said database further comprises a plurality of risk values computed by evaluating one or more instrument models employing one or more of said risk factors, each of said plurality of risk values being associated with an individual simulated instrument or pre-selected group of simulated instruments;
  ii. simulating changes to said simulated dynamic portfolio by evaluating said at least one rule to produce a changed simulated dynamic portfolio, wherein said changes are dependent on the value of said at least one tracking attribute at the current time step and on said selected possible future scenario, wherein said simulated dynamic portfolio becomes said changed simulated dynamic portfolio after said changed simulated dynamic portfolio is produced;
  iii. setting the current time step to the next time step of said plurality of future time steps and repeating substeps (i) and (ii);
  iv. repeating substep (iii) until said simulated dynamic portfolio has been valued at all of said plurality of future time steps;
(e) repeating steps (c) and (d) for each remaining possible future scenario of said plurality of possible future scenarios; and
(f) producing an output risk metric, wherein said output risk metric is dependent on at least one risk value stored in said database and the composition of the simulated dynamic portfolio under at least one of said plurality of possible future scenarios;
wherein for at least one simulation executed at step (d), the simulating substep performed therein comprises invoking a risk engine in generating one or more simulated instruments not existing at the time said at least one simulation is executed by evaluating an instrument model that employs one or more of said risk factors, and adding said generated simulated instruments to the simulated dynamic portfolio in producing a changed simulated dynamic portfolio.

2. The method as claimed in claim 1, wherein said at least one rule comprises a condition, and wherein said at least one rule is evaluated in substep (ii) of step (d) only when said condition is satisfied.

3. The method as claimed in claim 2, wherein said at least one rule is selected from the following group: a band rule, a barrier rule, a comparison rule, a functional rule, and a composite rule.

4. The method as claimed in claim 1, wherein each of said at least one rule is assigned a priority.

5. The method as claimed in claim 4, wherein each of said at least one rule is evaluated in substep (ii) of step (d) in order of priority.

6. The method as claimed in claim 1, wherein each of said plurality of instruments is one of the following: a financial instrument; a non-financial instrument.

7. The method as claimed in claim 1, wherein a filter is used with at least one of said at least one rule.

8. A computer-readable medium having computer readable instructions stored thereon when executed by a computer to perform a method, wherein a plurality of data structures defining a simulated dynamic portfolio for use with a risk management system in a simulation are embodied on said computer-readable medium, said simulated dynamic comprising a plurality of simulated instruments, the composition of said simulated dynamic portfolio being changeable under a plurality of possible future scenarios at a plurality of future time steps by a trade manager, each of the possible future scenarios having associated therewith a probability of the scenario occurring, said simulated dynamic portfolio comprising:

(a) a holdings data structure indicating simulated instruments and their quantity in said simulated dynamic portfolio; and (b) a strategy definitions data structure indicating a trade manager in which at least one rule for a trading strategy is defined, wherein said at least one rule is dependent on at least one tracking attribute, on at least one tracking position, and on at least one trade position, wherein said at least one rule is defined prior to executing said simulation;

wherein for each of said plurality of possible future scenarios at each of said plurality of future time steps, said at least one trade manager simulates changes to said simulated dynamic portfolio by valuing said simulated dynamic portfolio and evaluating said at least one rule to produce a changed simulated dynamic portfolio, wherein said changes are dependent on the value of said at least one tracking attribute at the current time step and on the respective possible future scenario, wherein said simulated dynamic portfolio becomes said changed simulated dynamic portfolio after said changed simulated dynamic portfolio is produced, wherein said changes to said simulated dynamic portfolio are reflected in said holding structure;

wherein said valuing comprises retrieving at least one risk value for each of one or more subsets of said simulated instruments in said simulated dynamic portfolio from a database, wherein said database comprises a plurality of values for risk factors associated with said respective possible future scenario and said current time step, wherein said database further comprises a plurality of risk values computed by evaluating one or more instrument models employing one or more of said risk factors, each of said plurality of risk values being associated with an individual simulated instrument or pre-selected group of simulated instruments;

and wherein for at least one of said plurality of possible future scenarios at one or more future time steps, said trade manager invokes a risk engine in generating one or more simulated instruments not existing at the time said at least one simulation is executed by evaluating an instrument model that employs one or more of said risk factors, and adds said generated simulated instruments to the simulated dynamic portfolio in producing a changed simulated dynamic portfolio.

9. The computer-readable medium as claimed in claim 8, wherein said at least one rule comprises a condition, and wherein said at least one rule is evaluated only when said condition is satisfied.

10. The computer-readable medium as claimed in claim 9, wherein said at least one rule is selected from the following group: a band rule, a barrier rule, a comparison rule, a functional rule, and a composite rule.

11. The computer-readable medium as claimed in claim 8, wherein each of said at least one rule is assigned a priority.

12. The computer-readable medium as claimed in claim 11, wherein each of said at least one rule is evaluated in order of priority.

13. The computer-readable medium as claimed in claim 8, wherein each of said plurality of instruments is one of the following: a financial instrument; a non-financial instrument.

14. The computer-readable medium as claimed in claim 8, wherein a filter is used with at least one of said at least one rule.

15. A risk management system operable on a plurality of instruments, said system comprising:

a computer processor configured to process;

(a) at least one risk engine adapted to determine a risk value for each simulated instrument of a plurality of simulated instruments, said risk value determined by evaluating an instrument model that employs one or more risk factors for said simulated instrument under one of a plurality of possible future scenarios;

(b) a database to store risk values of said plurality of simulated instruments and a plurality of values for risk factors, wherein each risk factor is associated with a possible future scenario and time step;

(c) a simulated dynamic portfolio of simulated instruments, the composition of said simulated dynamic portfolio being changeable under said plurality of possible future scenarios at a plurality of future time steps, each of the possible future scenarios having associated therewith a probability of the scenario occurring, said simulated dynamic portfolio comprising a holding structure indicating simulated instruments and their quantity in said simulated dynamic portfolio and a strategy structure indicating a trade manager in which at least one rule for a trading strategy is defined, wherein said at least one rule is dependent on at least one tracking attribute, on at least one tracking position, and on at least one trade position, wherein said at least one rule is defined prior to executing said simulation; wherein for each of said plurality of possible future scenarios at each of said plurality of future time steps, said at least one trade manager simulates changes to said simulated dynamic portfolio by valuing said simulated dynamic portfolio and evaluating said at least one rule to produce a changed simulated dynamic portfolio, wherein said changes are dependent on the value of said at least one tracking attribute at the current time step and on the respective possible future scenario, wherein said simulated dynamic portfolio becomes said changed simulated dynamic portfolio after said changed simulated dynamic portfolio is produced, wherein said changes to said simulated dynamic portfolio are reflected in said holding structure; wherein said valuing comprises retrieving at least one risk value for each of one or more subsets of said simulated instruments in said simulated dynamic portfolio from a database, wherein said database comprises a plurality of values for risk factors associated with said respective possible future scenario and said current time step, wherein said database further comprises a plurality of risk values computed by evaluating one or more instrument models employing one or more of said risk factors, each of said plurality of risk values being associated with an individual simulated instrument or pre-selected group of simulated instruments; and wherein for at least one of said plurality of possible future scenarios at one or more future time steps, said trade manager invokes a risk engine in generating one or more simulated instruments not existing at the time said at least one simulation is executed by evaluating an instrument model that employs one or more of said risk factors, and adds said generated simulated instruments to the simulated dynamic portfolio in producing a changed simulated dynamic portfolio; and (d) an aggregating engine adapted to retrieve said risk values from said database to produce an output risk metric dependent on at least one risk value stored in said database and the composition of said simulated dynamic portfolio under at least one of said plurality of possible future scenarios.

16. The system as claimed in claim 15, wherein said at least one rule comprises a condition, and wherein said at least one rule is evaluated only when said condition is satisfied.

17. The system as claimed in claim 16, wherein said at least one rule is selected from the following group: a band rule, a barrier rule, a comparison rule, a functional rule, and a composite rule.

18. The system as claimed in claim 15, wherein each of said at least one rule is assigned a priority.

19. The system as claimed in claim 18, wherein each of said at least one rule is evaluated in order of priority.

20. The system as claimed in claim 15, wherein each of said plurality of instruments is one of the following: a financial instrument; a non-financial instrument.

21. The system as claimed in claim 15, wherein a filter is used with at least one of said at least one rule.

22. The method as claimed in claim 1, wherein said trade manager comprises:
- a rule structure comprising said at least one rule for said trading strategy;
- a tracking position list indicating at least one of tracked instruments and tracked positions;
- a tracking attribute list indicating one or more tracked quantities;
- a target vector indicating one or more desired trade results;
- a trade position list indicating at least one of tradable instruments and tradable positions; and
- a funding position list indicating instruments and positions that are tradable to fund said trading strategy.

23. The method as claimed in claim 22, wherein at least some of the positions indicated in the funding position list are defined such that they are only available after a period of time has elapsed.

24. The computer-readable medium as claimed in claim 8, wherein said trade manager comprises:
- a rule structure comprising said at least one rule for said trading strategy;
- a tracking position list indicating at least one of tracked instruments and tracked positions;
- a tracking attribute list indicating one or more tracked quantities;
- a target vector indicating one or more desired trade results;
- a trade position list indicating at least one of tradable instruments and tradable positions; and
- a funding position list indicating instruments and positions that are tradable to fund said trading strategy.

25. The computer-readable medium as claimed in claim 24, wherein at least some of the positions indicated in the funding position list are defined such that they are only available after a period of time has elapsed.

26. The system as claimed in claim 15, wherein said trade manager comprises:
- a rule structure comprising said at least one rule for said trading strategy;
- a tracking position list indicating at least one of tracked instruments and tracked positions;
- a tracking attribute list indicating one or more tracked quantities;
- a target vector indicating one or more desired trade results;
- a trade position list indicating at least one of tradable instruments and tradable positions; and
- a funding position list indicating instruments and positions that are tradable to fund said trading strategy.

27. The system as claimed in claim 26, wherein at least some of the positions indicated in the funding position list are defined such that they are only available after a period of time has elapsed.

* * * * *

UNITED STATES PATENT AND TRADEMARK OFFICE
CERTIFICATE OF CORRECTION

PATENT NO. : 7,395,236 B2  
APPLICATION NO. : 10/828269  
DATED : July 1, 2008  
INVENTOR(S) : Degraaf et al.

Page 1 of 1

It is certified that error appears in the above-identified patent and that said Letters Patent is hereby corrected as shown below:

On the Title Page, item (54) and in the Specifications, column 1, line 1, Title
replace "RISK MANAGEMENT SYSTEM AND METHOD PROVIDING RULE-BASED EVOLUTION OF A PORTFOLIO OF INSTRUMENTS" with -- PROVIDING RULE-BASED EVOLUTION OF A PORTFOLIO OF INSTRUMENTS --, In the Specifications Column 10, lines 1-2, replace "Trade Position lists 176" with -- Trade Position 176 lists 176 --, In the Claims Column 12, lines 64-65, replace "a financial instrument; a non-financial instrument" with -- a financial instrument, and a non-financial instrument --, Column 13, lines 6-7, replace "simulated dynamic comprising" with -- simulated dynamic instrument comprising --, line 37, replace "said holding structure" with -- said holdings data structure --, Column 14, line 8, replace "a financial instrument; a non-financial instrument" with -- a financial instrument, and a non-financial instrument --, and Column 15, lines 25-26, replace "a financial instrument; a non-financial instrument" with -- a financial instrument, and a non-financial instrument --.

Signed and Sealed this  
Seventeenth Day of December, 2013

Margaret A. Focarino  
*Commissioner for Patents of the United States Patent and Trademark Office*